(12) United States Patent
Frey

(10) Patent No.: US 7,718,964 B2
(45) Date of Patent: May 18, 2010

(54) HIGH TIME-RESOLUTION ULTRASENSITIVE OPTICAL SENSOR USING A PLANAR WAVEGUIDE LEAKAGE MODE, AND METHODS FOR MAKING SAME

(75) Inventor: Laurent Frey, Fontaine (FR)

(73) Assignee: Commissariat a l'Energie Atomique, Paris (FR)

( * ) Notice: Subject to any disclaimer, the term of this patent is extended or adjusted under 35 U.S.C. 154(b) by 245 days.

(21) Appl. No.: 12/066,388

(22) PCT Filed: Sep. 25, 2006

(86) PCT No.: PCT/EP2006/066714

§ 371 (c)(1),
(2), (4) Date: Mar. 11, 2008

(87) PCT Pub. No.: WO2007/036510

PCT Pub. Date: Apr. 5, 2007

(65) Prior Publication Data

US 2009/0127460 A1   May 21, 2009

(30) Foreign Application Priority Data

Sep. 28, 2005   (FR) .................................. 05 52923

(51) Int. Cl.
 *H01L 27/18* (2006.01)
(52) U.S. Cl. .................................................. 250/336.2
(58) Field of Classification Search .............. 250/336.2; 385/12
See application file for complete search history.

(56) References Cited

U.S. PATENT DOCUMENTS

| | | | |
|---|---|---|---|
| 5,532,485 A | | 7/1996 | Bluzer et al. |
| 5,991,488 A | * | 11/1999 | Salamon et al. ............. 385/129 |
| 6,625,336 B2 | * | 9/2003 | Challener et al. ............. 385/12 |

FOREIGN PATENT DOCUMENTS

| | | |
|---|---|---|
| DE | 100 24 366 | 1/2002 |
| FR | 2 812 455 | 2/2002 |
| FR | 2 871 571 | 12/2005 |

OTHER PUBLICATIONS

Christ, A. et al., "Optical properties of planar metallic photonic crystal structures: Experiment and theory", Physical Review B. vol. 70, pp. 125113-1-125113-15, 2004 (XP-002388153).
Raether, Heinz, "Surface Plasmon on Smooth and Rough Surfaces and on Gratings", Springer-Verlag, pp. 10-11, 1988.
Bonnet, E. et al., "High resonant reflection of a confined free space beam by a high contrast segmented waveguide", Optical and Quantum Electronics, vol. 35, pp. 1025-1035, 2003.

* cited by examiner

*Primary Examiner*—David P Porta
*Assistant Examiner*—Marcus H Taningco
(74) *Attorney, Agent, or Firm*—Oblon, Spivak, McClelland, Maier & Neustadt, L.L.P.

(57) ABSTRACT

A high time-resolution ultrasensitive optical detector, using a planar waveguide leakage mode, and methods for making the detector. The detector includes a stacking with a dielectric substrate, a detection element, first and second dielectric layers, and a dielectric superstrate configured to send photon(s) into the light guide formed by the first layer. The thicknesses of the layers is chosen to enable a resonant coupling between the photon(s) and a leakage mode of the guide, the stacking having an absorption resonance linked to the leakage mode for a given polarization of the photon(s).

12 Claims, 6 Drawing Sheets

HIGH TIME-RESOLUTION ULTRASENSITIVE OPTICAL SENSOR USING A PLANAR WAVEGUIDE LEAKAGE MODE, AND METHODS FOR MAKING SAME

TECHNICAL FIELD

The present invention concerns a high time-resolution ultrasensitive optical detector and, in particular, a superconducting single photon detector, more simply known as SSPD.

The detector that is the subject of the invention uses a planar waveguide leakage mode.

The present invention further concerns methods for making said detector.

It applies in particular to the detection and the localisation of operating defects of a semi-conductor integrated circuit, by detection of the emission of specific photons by malfunctioning transistors.

It also applies to receiving and routing circuits for very high speed telecommunications, in particular to those that are intended for telecommunications satellites, on account of the very low heat dissipation of the detector that is the subject of the invention.

The invention further applies to the coding and the detection of the quantum code key in a cryptographic system.

It also applies to the manufacture of detector matrices for very high sensitivity imaging, as well as to single photon or correlated photon tomography.

STATE OF THE PRIOR ART

Emerging techniques, such as quantum computing and cryptography, the failure testing of integrated circuits in micro-electronics, photonic detection medical imaging, the detection of biological objects or the detection of very weak signals for telecommunications or astronomy, require radiation detectors, in particular in the visible domain or the near infrared domain, which are very rapid, have a very low jitter, make very little noise and are extremely sensitive: they have to be capable of detecting very low flux, even a single photon.

In this respect, reference should be made to the document [Verevkin 03] or the document [Romestain 04] which, like the other documents cited hereafter, are detailed at the end of the present description.

SSPD potentially have all the qualities mentioned above and are good candidates to replace the present avalanche photodiodes and photomultiplicator tubes, the performance of which is limited, particularly in the infrared domain.

SSPD exist in the form of STJ, in other words superconducting tunnel junctions, and in the form of bolometers, among which are found bolometers known as HEB, namely hot electron bolometers, which are the fastest.

HEB use ultra-thin superconducting films, the thickness of which is less than 10 nm, to obtain very short characteristic times, of around 10 ps (see [FR 2 812 455]). For these films, the preferred material is niobium nitride (NbN) in B1 cubic phase.

In such HEB, the NbN film is epitaxied on a substrate that is typically in sapphire and the orientation of which is 1$\bar{1}$02 (R plane); and after structuring, this film forms meanders, the width of which ranges from 100 nm to 200 nm, the film thereby having the shape of a serpentine in the active part of the detector (see [Villégier 04]).

FIG. 1A is a schematic sectional view of such a detector. In this figure, the NbN film and the substrate have respectively the references 2 and 4. FIG. 1B is a schematic top view of the detector.

A light beam I arrives on said detector, under a normal incidence, and is coupled to it through the intermediary of an optical fibre (not shown). The references R and T correspond respectively to the reflected and transmitted light beams. The projection of the incident beam I on the detector is represented as dotted lines in FIG. 1B.

The manufacture, the operation and the characterisation of these SSPD detectors are described for example in [Goltsman 03] or [Korneev 03]. The detection efficiency, or efficiency of conversion of the photon into an electrical signal, is a key parameter that has to be optimised and which would be equal to 100% for an ideal detector.

It depends on the fill fraction (overlap ratio of the incident beam and the active zone of the detector), the optical absorption in the layer of NbN and the capacity of the hot spot that is formed following the absorption of the photon, to create a transitory resistive barrier over the whole width of the superconducting track. A distinction is made between the detection efficiency and the quantum efficiency, which is defined for an overlap ratio of 100%.

The serpentine structure has been devised to increase the fill fraction compared to a simple straight track of NbN, deposited on a sapphire substrate and illuminated under a normal incidence. In the latest productions, the interval between two parallel and adjacent portions of the superconducting track is as small as the width of this superconducting track, and the fill fraction is around 50%. It can hardly exceed this value on account of the present technological limitations, associated with the electronic lithography that is used to form the serpentine structure.

Better overlap ratios may be envisaged with other techniques, but a structure in which the meanders are too close favours cross-talk and necessitates an increased length of superconducting material.

The optical absorption by NbN is around 30% for a thickness of 4 nm, in the case of the wavelengths used in telecommunications. The only way of increasing it would be to increase the thickness of the NbN layer, but the ratio between the section of the hot spot and the section of the superconducting strip would decrease, since the width of this strip is limited to around 100 nm, and that would cause a collapse in the overall efficiency (see [Korneev 03]).

The detection efficiency therefore cannot exceed around 15% with this architecture. It attains 5% to 7% in the latest generation of detectors (see [Korneev 04]).

It would probably be difficult to do better, since the long length of the NbN track (150 µm to 200 µm when this track is unwound) has two drawbacks, namely the non-uniformity of the width of the track and the classical or quantum fluctuations. These two drawbacks leave little hope of approaching the maximum efficiency.

Several solutions have been proposed to increase the coupling of the light in the absorbent region of the detector.

Using a mirror and an anti-reflection layer has for example been proposed. The light that has passed through the NbN without having been absorbed is then sent back to the NbN by a concave mirror (see [FR 2 812 455]) or by a planar mirror (see [Le Coupanec 03]). The film of NbN is if necessary covered with an anti-reflection layer to eliminate the losses by reflection of the incident wave.

The expected detection efficiency is 40% but it is in any case limited by the fill fraction (50%) which is inherent to any film design that is attacked under normal incidence.

Using a coupling by wave guide (see [Jackson 03]) has also been proposed. According to this approach, which is schematically illustrated by FIG. 2, the light 6 coming from a monomode optical fibre 8 is injected by a diffractive optical element 10 into a multimode planar waveguide in silicon 12, the latter being formed on a substrate in silica 14.

A serpentine of NbN 16 is deposited above this silicon guide. The ends of this serpentine are respectively provided with contact pads 18 and 20. The serpentine 16 absorbs the evanescent wave that is associated with the guided mode.

A photon, that it is wished to detect, is capable of being absorbed by a branch of the meanders formed by the serpentine, at each passage of the evanescent wave. The absorption of the light energy by the NbN can, in principle, approach 100% if the meanders are sufficiently numerous. But, as a result, the detection efficiency is limited by the long length of NbN.

In addition, the feasibility of the growth of monocrystalline NbN on silicon has not yet been clearly demonstrated: the epitaxial growth of NbN on Si necessitates awkward surface treatments of the silicon as well as the study of the deposition of interface layers by epitaxy.

Reference may also be made to the document [Yang 04]. In this latter document, the absorption of a layer of NbN, placed in a stacking of planar layers, in which a guided wave propagates, is studied.

An example of such a structure is schematically represented in FIG. 3A, in which may be seen a substrate 22 covered by a layer of sapphire 24, serving as wave guide, and a layer of NbN 26 that covers this layer 24. In an alternative, which is schematically represented in FIG. 3B, the layer of NbN is between the substrate and the layer of sapphire.

If the wave guide is such a layer of sapphire of appropriate thickness, the length of NbN necessary to absorb the light is typically of several tens of micrometers (the calculations being made in one dimension, for planar guides).

However, neither the structuring of the wave guide and the NbN in the plane of the layers, nor the practical formation of the detector are envisaged in this document [Yang 04]: it provides no technological solution including the choice of materials, a method of manufacture and the methods of injecting the light into the considered structure.

DESCRIPTION OF THE INVENTION

The present invention aims to resolve the problem of the design of a high time-resolution ultrasensitive optical detector, in particular a SSPD type detector, said detector having a detection efficiency clearly superior to those that are obtained in the prior art, this detector moreover being able to be produced by existing technological means.

In a precise manner, the subject of the present invention is an optical detector, intended to detect at least one photon, this detector comprising a stacking with a dielectric substrate having a refractive index $n_S$ and, on this substrate:
- a detection element, provided to generate an electrical signal from the energy of the photon(s) received, and
- a first dielectric layer having a refractive index $n_H$, this detector being characterised in that it further comprises:
- a second dielectric layer, placed on the first dielectric layer and having a refractive index $n_B$, $n_H$ being greater than $n_B$ and $n_S$, the detection element being placed between the substrate and the first dielectric layer or between the first and second dielectric layers, the first dielectric layer constituting a light guide, provided to guide the photon(s), the energy of which is then in part absorbed by the detection element, and
- a dielectric superstrate that has a refractive index $n_P$, $n_P$ being greater than $n_S$ and $n_B$, and which is placed on the second dielectric layer and intended to send the photon(s) into the light guide, the respective thicknesses of the first and second dielectric layers being chosen to enable a resonant coupling between the photon(s) and a leakage mode of the light guide, the stacking having an absorption resonance linked to this leakage mode, for a given polarization of the photon(s).

According to a preferred embodiment of the detector that is the subject of the invention, the detection element is placed between the substrate and the first dielectric layer.

Preferably, the detection element has the shape of a serpentine.

The length of this serpentine is preferably less than 300 µm.

According to a specific embodiment of the detector that is the subject of the invention, the detection element comprises a single layer of a material that is chosen among bolometric materials, superconducting materials and semiconducting materials.

This detection element may comprise a superconducting nitride phase. This phase may be niobium nitride.

The superstrate may have the shape of a prism or a hemisphere or a bevelled piece.

As an alternative, this superstrate comprises a thick dielectric layer, the thickness of which is at least equal to 15 µm, or a diffraction grating.

The present invention further concerns an optical detector, intended to detect at least one photon, this detector comprising:
- a polarization separator that has one input path and two output paths and which is intended to receive the photon(s) to be detected at the input path and to separate the incident polarization into two orthogonal components at its output paths, and
- two optical detectors complying with the detector that is the subject of the invention, these two optical detectors being respectively optically connected to these two output paths.

The present invention further concerns a method for making the detector that is the subject of the invention, wherein:
- the detection element is formed on a first dielectric substrate,
- the first dielectric layer is formed on the detection element,
- the second dielectric layer is formed on a second substrate,
- this second dielectric layer is put in place on the first dielectric layer,
- the second substrate is eliminated,
- the superstrate is formed, and
- this superstrate is put in place on the second dielectric layer.

The invention further concerns another method of making the detector that is the subject of the invention, wherein:
- the detection element is formed on the dielectric substrate,
- the first dielectric layer is formed on the detection element,
- the second dielectric layer is formed on the first dielectric layer, and
- the superstrate is formed on the second dielectric layer.

BRIEF DESCRIPTION OF DRAWINGS

The present invention will best be understood by reference to the following description of embodiments provided as an indication only and in no way limiting and by referring to the accompanying drawings in which.

DETAILED DESCRIPTION OF SPECIFIC EMBODIMENTS

The structure of the optical detector that is the subject of the invention makes it possible to improve considerably the detection efficiency by means of a stacking of uniform dielectric layers that are deposited on a superconducting layer forming a serpentine, this superconducting layer having an absorption resonance linked to the excitation of a leakage mode, for a given polarization. The absorption of the light can then approach 100% despite a recovery rate of 50%.

It should be noted that the detector that is the subject of the invention has to be able to operate with a very low flux of photons. The probability of absorption of a photon is assumed proportional to the local intensity of the electromagnetic field that would exist with a high and continuous flux of photons (same mappings).

Figure 1A:
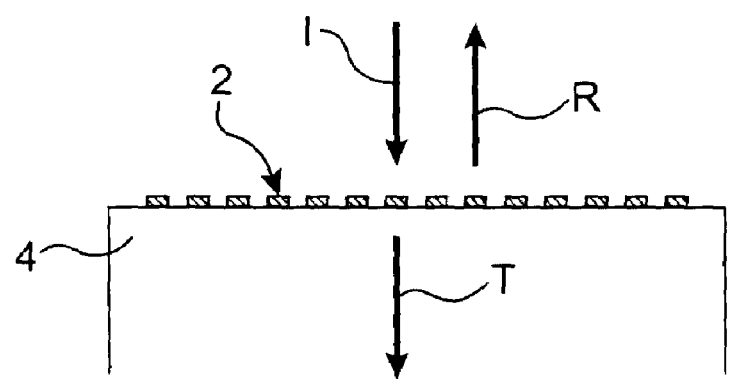
FIG. 1A is a schematic cross section of a known detector, of SSPD type, and has already been described.
Figure 1B:
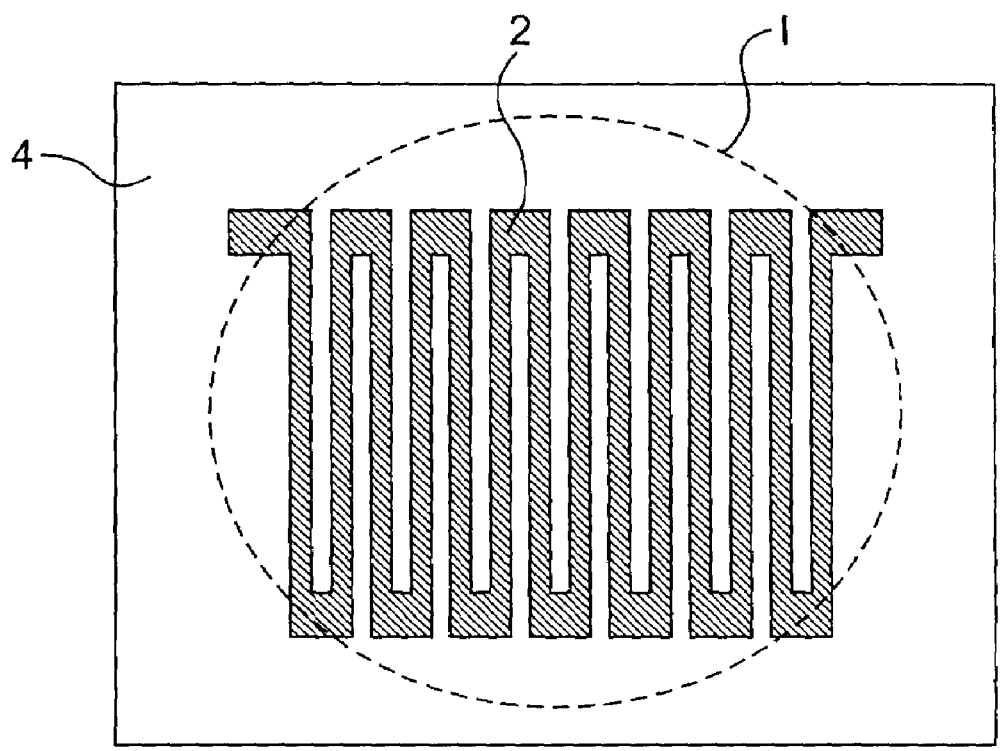
FIG. 1B is a schematic top view of the detector of FIG. 1A, and has already been described.
Figure 2:
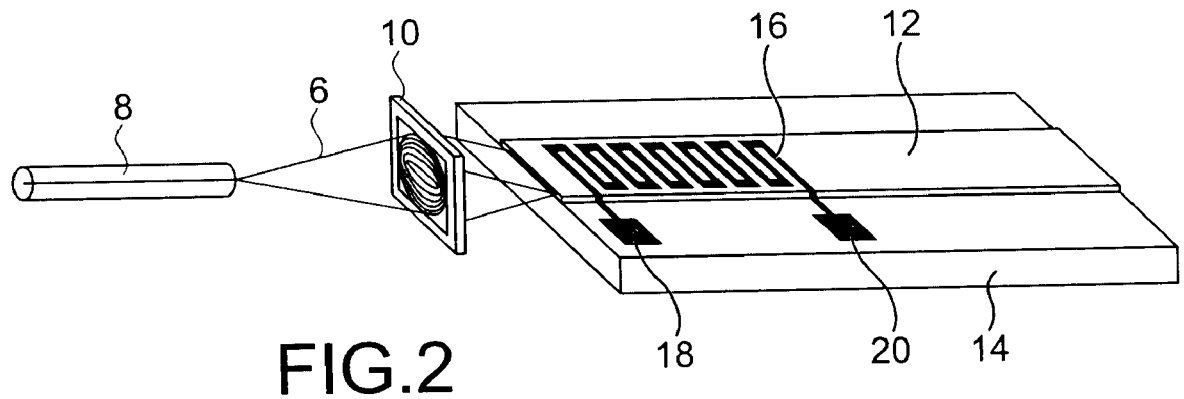
FIG. 2 is a schematic perspective view of another known detector, of SSPD type, and has already been described.
Figure 3A:
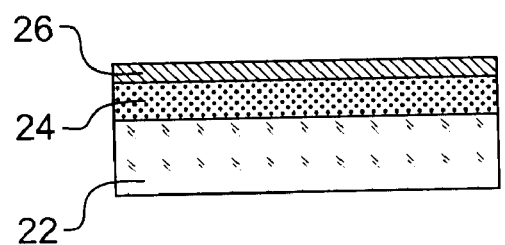
FIGS. 3A and 3B are schematic views of known guided wave planar multilayer structures, and have already been described.
Figure 3B:
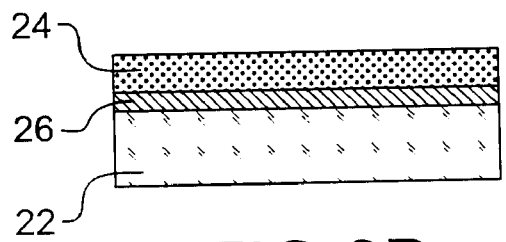
Figure 4A:
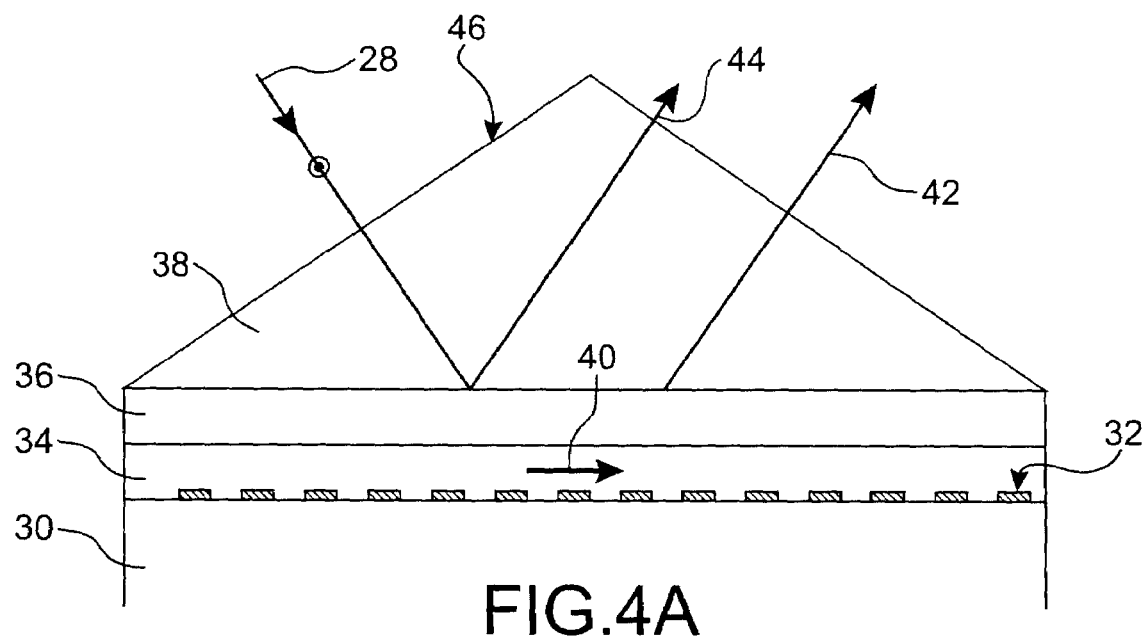
FIG. 4A is a schematic cross section of the generic structure of the detector that is the subject of the invention.
Figure 4B:
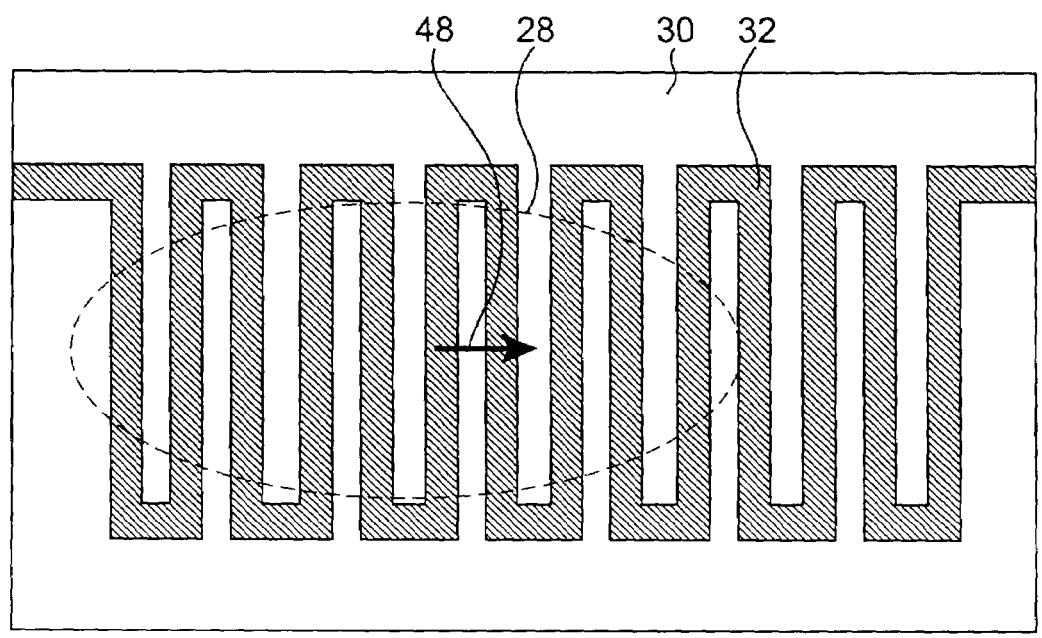
FIG. 4B is a schematic and partial top view of the detector of FIG. 4A.

FIG. 4A is a schematic cross section of an example of the detector that is the subject of the invention. FIG. 4B is a schematic top view of the detector of FIG. 4A. This detector is intended to detect a single photon or several photons, constituting an incident light beam 28.

The structure considered in FIGS. 4A and 4B comprises a dielectric substrate 30, the refractive index of which is noted $n_S$, and an ultra-thin superconducting film 32, for example in NbN, which forms meanders, as can be seen in FIG. 4B. The substrate 30 is suitable for the deposition of this film 32.

The detector of FIGS. 4A and 4B further comprises a dielectric layer of high index 34, the refractive index of which is noted $n_H$, a dielectric layer of low index 36, the refractive index of which is noted $n_B$, and a dielectric superstrate 38, the refractive index of which is noted $n_P$ and which is of prism shape.

The refractive indices considered confirm the following relations:

$$n_P > n_S, n_P > n_B, n_H > n_S, n_H > n_B.$$

The projection of the incident beam 28 on the detector is represented by dotted lines in FIG. 4B.

For a determined angle of incidence, greater than the critical angle $\arcsine(n_S/n_P)$, the incident light 28, which penetrates into this detector via the superstrate 38 and which is TE polarized, excites a leakage mode that is guided by the high index layer 34 and which radiates in the superstrate 38.

In the absence of diffracted order, particularly when the pitch of the diffraction grating constituted by the film 32 in serpentine shape is sufficiently small, the energy losses uniquely occur by absorption in the superconducting metal of the film and by radiation in the superstrate 38. There are no losses through transmission because the angle of incidence is greater than the critical angle.

The light 40, which is coupled in the leakage mode then radiated, emerges along a direction 42 that is identical to the direction of the wave 44 reflected by Fresnel reflection onto the interface between the layer 36 and the superstrate 38, and destructively interferes with this reflected wave 44. The coupling towards the leakage mode is resonating for certain thicknesses of layers 34 and 36. The angle of incidence corresponding to the resonance for these thicknesses is the resonance angle.

The coupled then radiated wave and the reflected wave then have the same amplitude and the light intensity resulting from their interference in the direction of the Fresnel reflection is zero, which maximises the absorption (100%) in the superconducting metal (resonant absorption).

The optimisation of the coupling in the leakage mode by adjustment of the respective thicknesses of the layers 34 and 36 is analogous to the optimisation of the coupling towards a surface plasmon in the Kretschman configuration by adjustment of the thickness of the metal (see the document [Raether 88]).

Reference should also be made to the document [Tishchenko 03], which uses the same phenomenological approach of coupled waves to optimise the "abnormal" or resonating reflection in the guides comprising gratings.

The different resonances that are produced as a function of the respective thicknesses of the layers 34 and 36 (in particular the thickness of the high index layer 34) correspond to the excitation of leakage modes of different orders. The fundamental mode, corresponding to a single field maximum in the high index layer 34, is excited for the smallest thickness of this layer 34. The greater the thickness of this high index layer, the higher the order of the excited mode.

The superstrate 38 is preferentially in prism shape so that the incident beam 28 can have a normal incidence (90° angle of incidence) on the input face 46 of this prism and is subject to the least possible losses by Fresnel reflection onto this input face.

As an alternative, for coupling of the incident beam in the structure, may be used:
  a dielectric material in hemisphere shape,
  a thick planar dielectric layer (thickness of around 15 to 20 micrometers or more), making the light to be detected penetrate under an oblique incidence, by the edge of this layer, if the index of this layer and the resonance angle enable the propagation with this angle in the thick layer,
  a diffraction grating, preferentially blazed to have a good coupling efficiency.

It is preferable that the order of magnitude of the length of the unwound serpentine is less than that of the devices of the prior art (typically 300 µm), to avoid degrading the detection efficiency and the jitter.

In the case of a detector with a single pixel, it is therefore desirable that the section of the incident light beam typically does not exceed 10 µm×10 µm, the standard dimension of the core of an optical fibre. The incident beam, which in the best case is limited by the diffraction, then has a non negligible divergence (numerical aperture of around 0.1).

The angular acceptance of the resonant structure has to exceed 15° (full width at half maximum) in the air to enable a coupling of at least 90% from a Gaussian beam.

Such values are accessible with layers whose thicknesses are equal to several hundreds of nanometers, with materials widely used in opto-electronics (see the examples of structures given hereafter).

The leakage mode propagates over a certain distance (propagation length) before being absorbed. As a result, the film structured in meanders has to extend beyond the zone illuminated by the incident beam, in the direction 48 (FIG. 4B) of the propagation of the leakage mode, to continue to absorb the energy that propagates outside of the illuminated zone, demarcated by the dotted lines in FIG. 4B.

Nevertheless, the propagation length of the leakage mode has to be as short as possible. Indeed, as soon as this mode propagates outside of the illuminated zone, the re-emitted wave can no longer interfere with the light that undergoes Fresnel reflection, light that does not exist outside of the illuminated zone, and losses by radiation occur in the superstrate.

Resonances also exist in the case of a TM polarization of the incident beam to be detected and involve plasmon modes at the superconductor/substrate interface, modes that also give rise to leaks in the superstrate. These resonances take place for thicknesses of layers that are in general different from those that correspond to the TE case.

Moreover, the resonances are relatively insensitive to the orientation of the branches of the serpentine compared to the incidence plane of the light to be detected. In the example of FIGS. 4A and 4B, these branches are perpendicular to the incidence plane.

It should moreover be noted that the detector that is the subject of the invention is designed for a light of given wavelength, because the resonance closely depends on the wavelength. It is also designed for a given polarization (TE or TM). In the case of an incident beam of unknown polarization, a polarization separator and a detector as described above may be used on each of the output paths of this separator.

Figure 5:
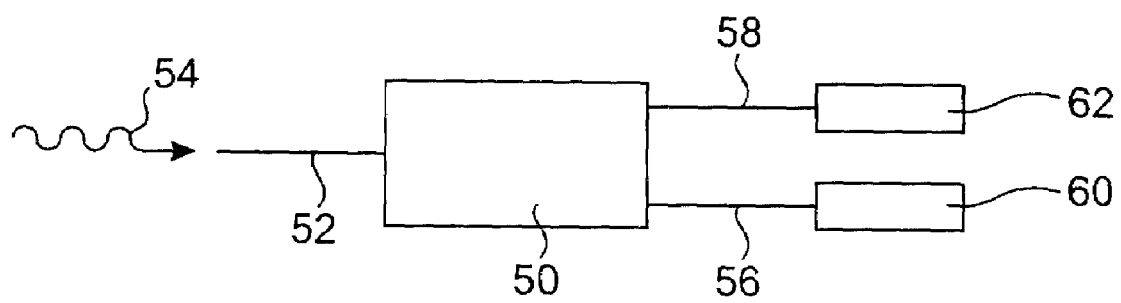
FIG. 5 is a schematic view of an optical detector comprising a polarization separator and two detectors according to the invention.

This is schematically illustrated by FIG. 5, where a polarization separator 50 may be seen, the input path 52 of which receives the light to be detected 54 and the two output paths 56 and 58 of which are respectively coupled to two detectors according to the invention 60 and 62 to inject there into respectively a TE polarized beam and a TM polarized beam, resulting from the decomposition of the light 54 by the separator 50.

The detection of the light energy in the superconductor may take place:

either according to the principle of threshold hot electron bolometers, which use a sub-critical current polarization (see [Korneev 04]), here including moreover the PSC or phase-slip centres mechanism, or by measuring the rapid variation of the Josephson current (detection of a "Josephson vortex") of a superconducting junction (STJ) or a SQUID, or by detection of the impedance variation of a superconducting tunnel junction, that is polarized in its "gap" of quasi-particles, according to the principle of SIS receivers (by eliminating the Josephson current by means of a magnetic field).

Examples of methods of making detectors according to the invention are given hereafter.

Such a detector can be formed by well controlled technological means (deposition of thin films, transfer of substrates). The thicknesses of the layers, thicknesses that are provided to excite a fundamental mode in TE or TM polarization, are not critical (tolerance of around ±5%), outside of the thickness of the superconductor, which can be correctly controlled by epitaxy. The values of the refractive indices are given at the wavelength of 1.55 µm by way of example.

The materials used, except for the superconductor, have a very low coefficient of extinction, less than $5 \times 10^{-4}$, which renders the losses by absorption in these materials negligible.

The methods that will be described can apply to the manufacture of a detector comprising a unique pixel and illuminated by a monomode optical fibre, or to the manufacture of a linear array of pixels, this array being perpendicular to the incidence plane of the light to be detected.

Figure 6A:
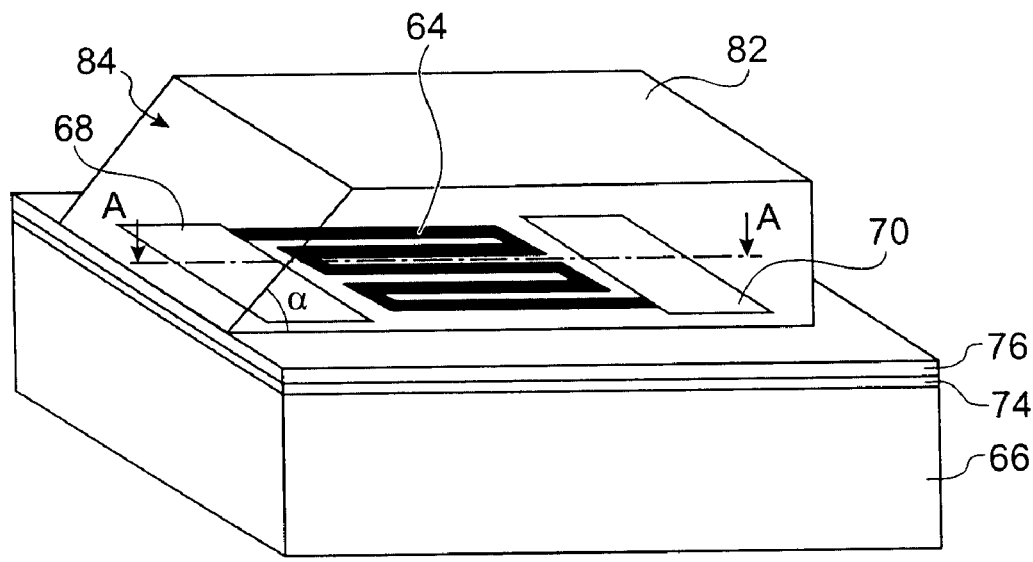
FIG. 6A is a schematic perspective view of a first example of the detector that is the subject of the invention.
Figure 6B:
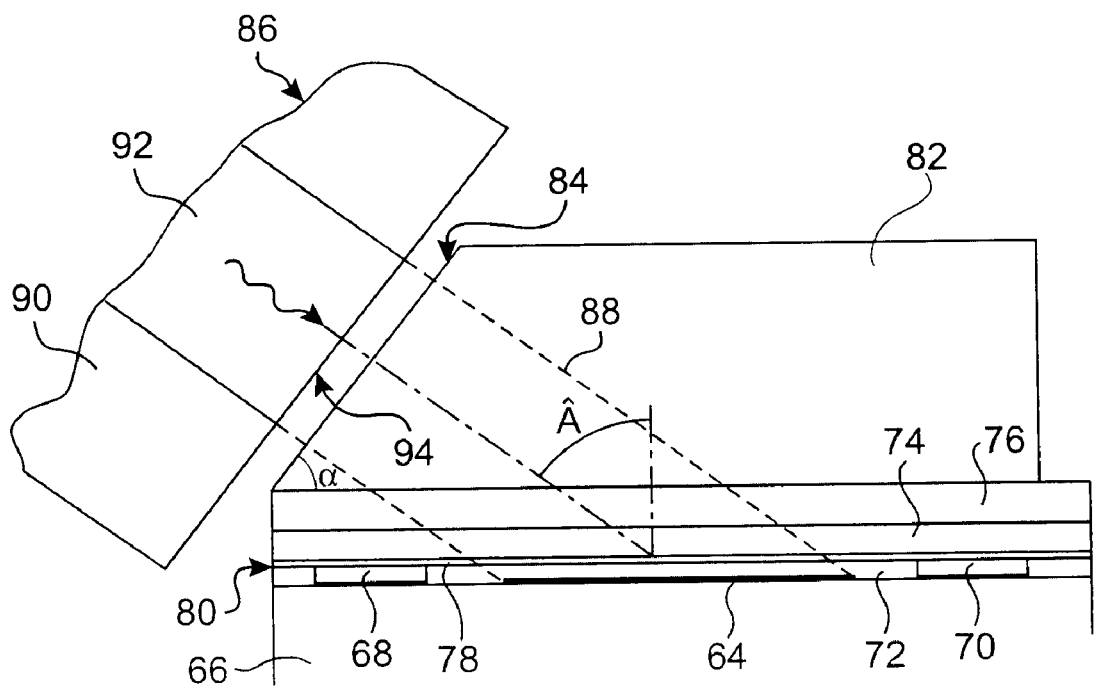
FIG. 6B is a schematic cross section of the detector of FIG. 6A.
Figure 6C:
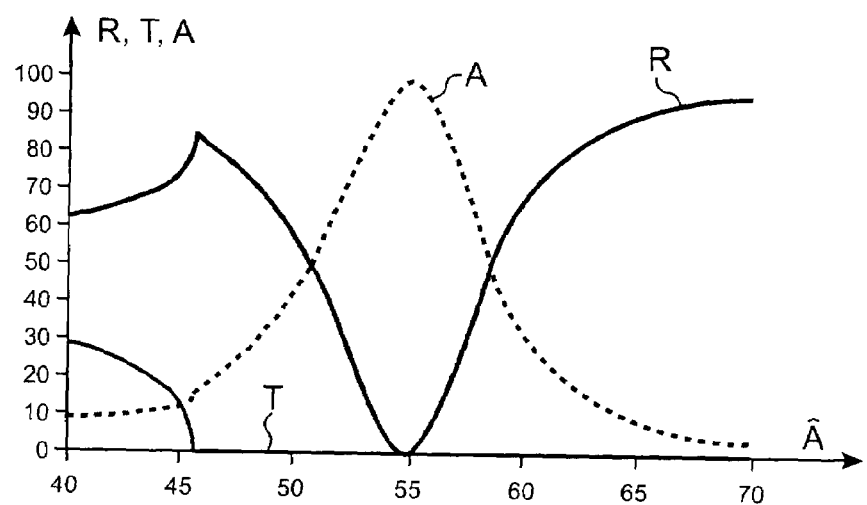
FIG. 6C shows the variations in the coefficients of reflection (curve R), transmission (curve T) and absorption (curve A) of the detector of FIGS. 6A and 6B, as a function of the angle of incidence, on this detector, of the light to be detected.

A method that uses a transfer, referring to FIGS. 6A to 6C will firstly be described hereafter.

It is pointed out that FIG. 6B is the AA section of FIG. 6A, that the scales are not respected in these FIGS. 6A and 6B and that the positioning patterns, enabling the manufacture of the detector (SSPD), are not shown.

The method comprises the following steps 1 to 7.

1. Firstly an ultra-thin superconducting film 64 in NbN is deposited, the thickness of which is around 4 nm and the refractive index n of which is approximately equal to 2.5+4.5j, where $j^2=-1$, on a sapphire substrate 66, the refractive index $n_S$ of which is equal to 1.75; then, by photolithography and etching, a structure in meanders is formed from this film, as in the prior art ([FR 2 812 455]), this structure having a pitch of 400 nm and a track width of 200 nm for example, and positioning patterns (not shown) are also formed in NbN on the substrate 66; moreover, electrical contacts 68 and 70 in gold or platinum are formed, the thickness of which is equal to around 15 nm, at the two ends of the film structured in this way.

2. A layer 72 of $SiO_2$ is deposited above the film and its contacts, by sputtering or by PECVD at 350° C., this layer 72 serving as adhesion layer and having a thickness of around 60 nm; the layer 72 is then planed over around 40 nm until the contacts 68 and 70 are reached.

3. An SOI (silicon on insulator) substrate is prepared, firstly comprising at the surface a thin film 74 of Si, of 70 nm thickness and of refractive index $n_H$=3.5, this layer 74 comprising positioning patterns (not shown), and secondly a buried layer 76 of 220 nm in $SiO_2$, the refractive index $n_B$ of which is equal to 1.45. If necessary, a very thin film 78 of $SiO_2$ is deposited on this substrate, to have better adhesion during the subsequent bonding of the SOI substrate onto the substrate 66, the thickness of this layer 78 being around 5 nm to 10 nm. A dry or chemical etching is then carried out to form deep windows (not shown) in the Si substrate (part not shown of the SOI substrate, bearing the layers 74, 76 and if necessary 78) up to the layer 76 of $SiO_2$, to free the contacts 68 and 70 and the positioning patterns.

4. A "full plate" bonding of the SOI substrate on the sapphire substrate 66 is then carried out by molecular bonding for example at ambient temperature, after having carried out an alignment in the visible domain through the layers of silica referenced 76, 78, along the positioning patterns, a lateral alignment accuracy of ±0.5 µm being largely sufficient. If necessary, an annealing at several hundreds of degrees Celsius is carried out to reinforce the bonding. The interface resulting from the bonding, and therefore separating the layer 72 from the layer 74 or, if it exists, the layer 78, has the reference 80 in FIG. 6B.

5. A thinning of the Si substrate is then carried out by mechanochemical polishing or by planing down to the layer of $SiO_2$ referenced 76.

6. A prism or a bevelled piece 82 serving as superstrate is prepared, from a crystal of $TiO_2$ which, as it happens, is birefringent. The bevelling angle α is around 55°. This bevelling is carried out with an appropriate orientation so as to control the refractive index seen by the incident light beam. In the example considered, this index $n_P$ is equal to 2.45. An anti-reflection treatment of the face 84 resulting from the bevelling is then carried out, this face constituting the input face of the light to be detected. Then the bevelled piece is bonded by molecular bonding onto the layer 76 in $SiO_2$, as can be seen in FIGS. 6A and 6B. A positioning accuracy of ±1 μm is largely sufficient.

7. The optical fibre 86 intended for the propagation of the incident light beam 88 that it is wished to detect is then put in place. The cladding and the core of this fibre have respectively the references 90 and 92 in FIG. 6A. For this putting in place, an active alignment of the optical fibre is carried out on the detector either by direct positioning, or by imaging of the output face 94 of the core of the fibre on the input face 84 of the bevelled piece. In the first case, for reasons of size, it is necessary to cut the chip bearing the detector at a few tens of micrometers of the active zone of this chip, zone where the detector is located, in order to be able to approach the fibre, of exterior diameter 250 μm, close enough to the bevelled piece. The optical and electrical connections are then established and the detectors are cooled to their temperature of use (for example 4K).

The size (75 mm) of the sapphire substrates that are currently used to make the structures of SSPD detectors can easily be extended to 100, 200 or 300 mm; it is therefore compatible with the size of silicon substrates used in the micro-electronics industry and makes possible the production at low cost of numerous chips on a same substrate.

The structure that has been described in reference to FIGS. 6A and 6B is resonating at 1.55 μm in the fundamental leakage mode, for a TE polarization of the beam to be detected. The limit angle beyond which the transmission is zero is 45.5°.

The resonance occurs for an angle of incidence Â of 55° on the NbN. If the branches of the serpentine 64 are parallel to the incidence plane, the full angular width at half maximum of the resonance is 8° in the superstrate, which corresponds to 19° in the air (see FIG. 6C, which results from a simulation based on rigorous coupled wave analysis or RCWA. This guarantees a coupling of around 92% of the incident light through the intermediary of the superstrate towards the leakage mode, with a lighting by a standard optical fibre having a mode diameter of 10 μm.

The energy coupled in the leakage mode is 95% absorbed after 2 μm of propagation, a short distance compared to the length of the illuminated zone (17 μm), which render the losses by radiation outside of the illuminated zone very low.

It is pointed out that FIG. 6C shows the variations in the coefficients of reflection R, transmission T and absorption A as a function of the angle of incidence Â of the light to be detected on the NbN film 64, for the detector that has been described in reference to FIGS. 6A and 6B.

Figure 7B:
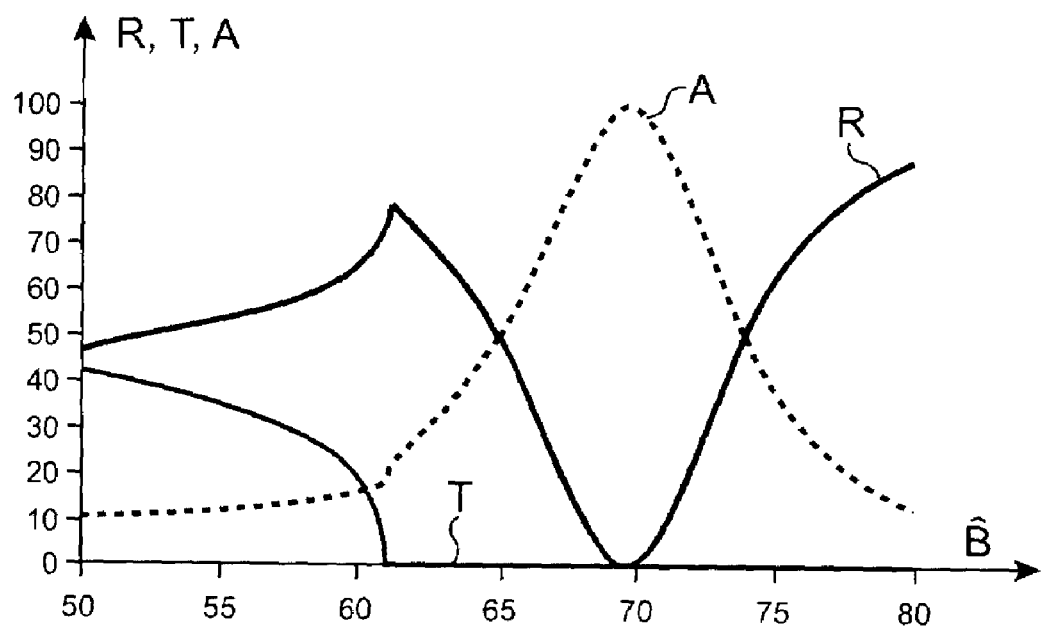
FIG. 7B shows the variations in the coefficients of reflection (curve R), transmission (curve T) and absorption (curve A) of the detector of FIG. 7A, as a function of the angle of incidence, on this detector, of the light to be detected.

A method that uses a deposition, in reference to FIGS. 7A and 7B, will now be described.

This method comprises the following steps 1 to 8.

Figure 7A:
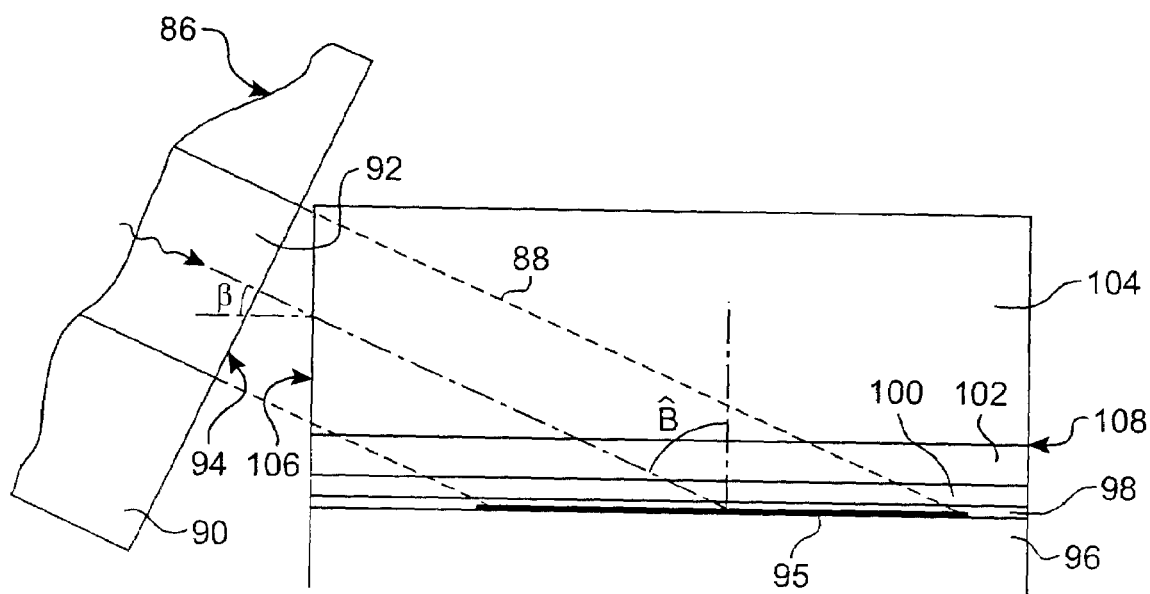
FIG. 7A is a schematic cross section of a second example of detector according to the invention.

It is pointed out that the scales are not respected in FIG. 7A, that the contacts with which are provided the ends of the superconducting film in serpentine shape are not shown and that the refraction of the light in the detector (SSPD) of FIG. 7A is not shown either.

1. Firstly an ultra-thin superconducting film 95 in NbN is deposited, the thickness of which is around 4 nm and the refractive index n of which is around 2.5+4.5j, where $j^2=-1$, on a sapphire substrate 96, the refractive index $n_S$ of which is 1.75, then a structure in meanders is formed from this film 95, as in the prior art ([FR 2812455]), this structure having a pitch of 400 nm and a track width of 200 nm for example. Moreover, electrical contacts (not shown) in gold or in platinum are formed, the thickness of which is around 15 nm. Then, if necessary, a very thin film 98 of $SiO_2$ is deposited on the substrate 96 bearing the film 95.

2. A layer 100 of $TiO_2$ is deposited, the refractive index $n_H$ of which is equal to 2.3 and the thickness of which is equal to 220 nm, by evaporation at a temperature of around 100° C., on the substrate bearing the film and its contacts as well as, if it exists, the layer 98.

3. A layer 102 of $SiO_2$ is deposited, the refractive index of which is 1.45 and the thickness of which is 260 nm, by evaporation or sputtering at around 100° C., on the layer 100 of $TiO_2$.

4. A thick layer 104 of $Si_3N_4$ serving as superstrate is deposited, the refractive index of which is equal to 2 and the thickness of which is at least equal to 20 μm, by PECVD, at a temperature of around 300 to 400° C., on the layer 102 of $SiO_2$. With $Si_3N_4$, a coupling by the wafer under oblique incidence may be envisaged, for the light to be detected.

5. Windows are etched through the deposited layers until the contacts are reached, in order to be able to access said contacts.

6. The chip bearing the detector thereby formed is cut by polidicing (a positioning accuracy of a few tens of micrometers is sufficient) and, if necessary, the face of the chip cut in this way is polished, which is intended to constitute the input face 106 of the light to be detected.

7. An anti-reflection treatment of this input face 106 is carried out.

8. Then, the optical fibre 86 already mentioned above is put in place, intended for the propagation of the light to be detected, by active alignment on the detector of FIG. 7A. This positioning is such that the angle of incidence β of this light on the input face 106 is equal to 46°, which gives, by refraction, an angle of incidence of 69° at the interface 108 separating the layers 102 and 104. The optical and electrical connections are then established and the detectors are cooled to their temperature of use (for example 4K).

The structure that has just been described in reference to FIG. 7A is resonating at 1.55 μm in the fundamental leakage mode, for a TE polarization of the light beam to be detected. The limit angle beyond which the transmission is zero is 61°.

The resonance occurs for an angle of incidence of 69° at the interface 108. If the meanders of the serpentine 94 are in the incidence plane, the mid-height angular width of the resonance is equal to 9° in the superstrate, which corresponds to 18° in the air (see FIG. 7B, which results from a simulation based on RCWA). This guarantees a coupling of around 92% of the incident light through the intermediary of the superstrate towards the leakage mode, with a lighting by a standard optical fibre having a mode diameter of 10 μm.

The energy coupled in the leakage mode is 95% absorbed after 3.5 μm propagation, a short distance compared to the length of the illuminated zone (27 μm), which renders the losses by radiation outside of the illuminated zone very low.

It should be pointed out that FIG. 7C shows the variations in the coefficients of reflection R, transmission T and absorption A as a function of the angle of incidence B̂ of the light to be detected on the NbN film 95, for the detector that has been described in reference to FIG. 7A.

By way of indication and in no way limiting, instead of the above mentioned materials for the superstrate, the high index layer and the low index layer, the following materials (the corresponding refractive indices are indicated in brackets) may in particular be used:

for the superstrate and the high index layer: $Si_3N_4$ (2), $SrTiO_3$ (2.26), $TiO_2$ (2.45 to 2.7 depending on the orientation of the crystal), amorphous Si (3 to 3.5 depending on the hydrogen content), for the low index layer: $Al_2O_3$, MgO (1.75).

In the figures, the means of polarizing the detection element (serpentine superconductor) and the means of processing the signals provided by this element have not been shown.

In the examples of the invention, this detection element has the preferred shape of a serpentine but the invention can also be implemented if it has other shapes.

In addition, in the examples of the invention, this detection element is between the substrate of the detector and the layer of high index of said detector. However, the invention may also be implemented if this detection element is between the low index layer and the high index layer.

Moreover, instead of using a superstrate in prism or bevelled piece shape, a superstrate in hemisphere shape may be used, which also enables a normal incidence (along a radius of the hemisphere) of the light to be detected.

A superstrate containing a diffraction grating to send the light to be detected into the high index layer can also be used.

Moreover, instead of NbN, other superconducting materials can be used to form the detection element, for example other nitride phases (MoN, TiN, etc.) or cuprate phases ($YBa_2Cu_3O_{7-x}$, $ReBa_2Cu_3O_{7-x}$, etc.).

More generally, instead of being made of a superconducting material, this detection element may be made of any material suited to detecting a low light energy and to return an electrical signal corresponding to this energy. This may be for example a semiconducting or bolometric material.

The documents cited in the present description are the following:

[FR2 812 455] FR 2 812 455 A, invention of R. Sobolewski et al. (Schlumberger and Rochester University, February 2002)

[Gol'tsman 03] Gol'tsman et al., "Fabrication of Nanostructured Superconducting Single Photon Detectors", IEEE Transactions on Applied Superconductivity, 13 (2), 192, June 2003

[Jackson 03] D. Jackson, J. Stern, "High bandwith, improved quantum efficiency detector development for multi-GHz class OKD throughput", Jet Propulsion Laboratory, California Institute of Technology, Single Photon Detector Workshop, NIST, Gaithersburg, April 2003

[Korneev 03] A. Korneev and al., "GHz counting rate NbN single-photon detector for IR diagnostics of VLSI CMOS circuits", Microelectronics Engineering 69, 274 (2003)

[Korneev 04] A. Korneev and al., "Sensitivity and gigahertz counting performance of NbN superconducting single-photon detectors", Appl. Phys. Lett. 84, 5338 (2004)

[LeCoupanec 03] LeCoupanec, W. K. Lo, K. R. Wilsher, "An ultra-low dark count and jitter, superconducting, single-photon detector for emission timing analysis of integrated circuits", Microelectronics Reliability, 43 (2003), 1621

[Raether 88] H. Raether, "Surface plasmons on smooth and rough surfaces and on gratings", Springer, Berlin, 1988

[Romestain 04] R. Romestain et al., "Fabrication of superconducting niobium nitride hot electron bolometer for single photon counting", New Journal of Physics, 6, 129, 2004

[Tishchenko 03] E. Bonnet et al, "High resonant reflection of a confined free space beam by a high contrast segmented waveguide", Opt. Quant. Elec. 35, 1025 (2003)

[Verevkin 03] A. Verevkin and al., "GHz-Rate Superconducting Photon Counting Detector", Single Photon Detector Workshop, NIST Gaithersburg, April 2003

[Villégier 04] J. C. Villégier, "Fabrication of High-Speed Single Photon Detectors and Analog-to-Digital Modulators in NbN Technology for Quantum Information Processing", invited conference, workshop WEH 28 November-3 December, Bad Honnef, D

[Yang 04] F. Wang, "Photo-détecteurs supraconducteurs pour l'information quantique photonique", rapport de stage d'option scientifique, Ecole Polytechnique, July 2004.

The invention claimed is:

1. An optical detector, configured to detect at least one photon, the detector comprising:
   a stacking with a dielectric substrate having a refractive index $n_S$ and, including on the substrate:
      a detection element configured to generate an electrical signal from the energy of the at least one photon received, and
      a first dielectric layer having a refractive index $n_H$;
      a second dielectric layer, placed on the first dielectric layer and having a refractive index $n_B$, $n_H$ being greater than $n_B$ and $n_S$, the detection element being placed between the substrate and the first dielectric layer or between the first and second dielectric layers, the first dielectric layer constituting a light guide, configured to guide the at least one photon, the energy of which is then in part absorbed by the detection element, and
      a dielectric superstrate that has a refractive index $n_P$, $n_P$ being greater than $n_S$ and $n_B$, and which is placed on the second dielectric layer and is configured to send the at least one photon into the light guide,
   wherein respective thicknesses of the first and second dielectric layers enable a resonant coupling between the at least one photon and a leakage mode of the light guide, the stacking having an absorption resonance linked to the leakage mode, for a given polarization of the at least one photon.

2. A detector according to claim 1, wherein the detection element is placed between the substrate and the first dielectric layer.

3. A detector according to claim 1, wherein the detection element has a shape of a serpentine.

4. A detector according to claim 3, wherein the length of the serpentine is less than 300 µm.

5. A detector according to claim 1, wherein the detection element comprises a single layer of a material that is chosen among bolometric materials, superconducting materials, and semiconducting materials.

6. A detector according to claim 1, wherein the detection element comprises a superconducting nitride phase.

7. A detector according to claim 6, wherein the phase is of niobium nitride.

8. A detector according to claim 1, wherein the superstrate has a shape of a prism or a hemisphere or a bevelled piece.

9. A detector according to claim 1, wherein the superstrate comprises a thick dielectric layer, the thickness of which is at least equal to 15 µm, or a diffraction grating.

10. An optical detector, configured to detect at least one photon, the detector comprising:
    a polarization separator including one input path and two output paths, and which is configured to receive the at least one photon to be detected at the input path and to separate the incident polarization into two orthogonal components at its output paths; and two optical detectors according to claim 1, the two optical detectors being respectively optically connected to the two output paths.

11. A method of making the detector according to claim 1, comprising:

forming the detection element on a first dielectric substrate;

forming the first dielectric layer on the detection element;

forming the second dielectric layer on a second substrate;

putting the second dielectric layer in place on the first dielectric layer;

eliminating the second substrate;

forming the superstrate; and putting in the superstrate in place on the second dielectric layer.

12. A method of making the detector according to claim 1, comprising:

forming the detection element on the dielectric substrate;

forming the first dielectric layer on the detection element;

forming the second dielectric layer on the first dielectric layer; and forming the superstrate on the second dielectric layer.

* * * * *